United States Patent
Ruzic et al.

(10) Patent No.: US 7,922,614 B2
(45) Date of Patent: Apr. 12, 2011

(54) CHAIN FOR A MACHINE DRIVE, TRANSPORT OF MATERIAL IN A MACHINE OR THE LIKE, AND PACKAGING MACHINE COMPRISING ONE SUCH CHAIN

(75) Inventors: Ivo Ruzic, Kempten (DE); Elmar Ehrmann, Bad Groenenbach (DE)

(73) Assignee: Multivac Sepp Haggenmuller GmbH & Co. KG (DE)

( * ) Notice: Subject to any disclaimer, the term of this patent is extended or adjusted under 35 U.S.C. 154(b) by 559 days.

(21) Appl. No.: 11/990,186

(22) PCT Filed: Aug. 7, 2006

(86) PCT No.: PCT/DE2006/001382
§ 371 (c)(1),
(2), (4) Date: Feb. 8, 2008

(87) PCT Pub. No.: WO2007/019823
PCT Pub. Date: Feb. 22, 2007

(65) Prior Publication Data
US 2010/0137087 A1    Jun. 3, 2010

(30) Foreign Application Priority Data
Aug. 11, 2005    (DE) ................ 10 2005 038 356

(51) Int. Cl.
*F16G 13/02* (2006.01)

(52) U.S. Cl. ............ 474/206; 474/212; 474/226; 59/78

(58) Field of Classification Search .................. 474/206, 474/212, 213, 220, 226, 202; 59/78
See application file for complete search history.

(56) References Cited

U.S. PATENT DOCUMENTS

| | | | |
|---|---|---|---|
| 2,627,756 A | | 2/1953 | Bendall |
| 2,770,143 A | * | 11/1956 | Bendall ..................... 474/202 |
| 2,770,144 A | * | 11/1956 | Bendall ..................... 474/202 |
| 3,282,121 A | | 11/1966 | Wehner |
| 3,768,596 A | * | 10/1973 | Solymos ..................... 187/254 |
| 4,147,069 A | | 4/1979 | Derner |
| 4,170,281 A | | 10/1979 | Lapeyre |
| 4,214,488 A | | 7/1980 | Conrad |
| 4,826,065 A | | 5/1989 | Natterer et al. |
| 6,308,510 B1 | * | 10/2001 | Christmas ..................... 59/78 |
| 6,658,837 B1 | * | 12/2003 | Vogt ..................... 59/4 |
| 6,939,260 B2 | * | 9/2005 | Mu et al. ..................... 474/212 |
| 7,246,699 B2 | * | 7/2007 | Frost et al. ..................... 198/851 |

FOREIGN PATENT DOCUMENTS

| | | |
|---|---|---|
| CA | 2135185 | 5/1992 |
| DE | 839 148 | 4/1941 |
| DE | 834 311 | 2/1949 |
| DE | 1 478 297 | 3/1969 |

(Continued)

Primary Examiner — Emmanuel M Marcelo
(74) Attorney, Agent, or Firm — Brooks Kushman P.C.

(57) ABSTRACT

The invention proposes a chain for a machine drive, transport of material in a machine or the like, and also a packaging machine comprising one such chain, this chain being better than known link chains at meeting requirements in respect of hygiene conditions during operation and cleaning. This is achieved according to the invention in that flexible chain links (4) are provided between rigid chain links (2), the flexible chain links (4) being fixed to the rigid chain links (2).

20 Claims, 9 Drawing Sheets

FOREIGN PATENT DOCUMENTS

| | | |
|---|---|---|
| DE | 2 241 127 | 3/1974 |
| DE | 31 05 891 C2 | 9/1982 |
| DE | 33 15 419 A1 | 10/1984 |
| DE | 296 17 426 U1 | 2/1997 |
| DE | 103 51 125 A1 | 6/2005 |
| DE | 103 54 174 A1 | 6/2005 |
| EP | 1 503 107 A2 | 2/2005 |
| FR | 1 215 244 | 11/1958 |
| FR | 2 218 509 | 1/1974 |
| JP | 2004-28200 | 1/2004 |

* cited by examiner

CHAIN FOR A MACHINE DRIVE, TRANSPORT OF MATERIAL IN A MACHINE OR THE LIKE, AND PACKAGING MACHINE COMPRISING ONE SUCH CHAIN

BACKGROUND

The invention relates to a chain for a machine drive, transport of material in a machine or the like, and to a packaging machine having one such chain.

A wide variety of different machines use link chains as drive and/or transporting elements. Thus, for example, packaging machines, in particular so-called thermoforming machines, use link chains in order, via gripper mechanisms, to grip a packaging film and transport the same to the various processing stations of the packaging machine. The link chain here serves not just as transporting means, but also for positioning the film precisely in the various processing stations.

The disadvantage of using such a conventional link chain is the fact that the articulations between the individual chain links form gaps and dirt traps which can easily attract dirt and are difficult to access for cleaning purposes. For permanent functioning of such link chains, in addition, a certain amount of lubrication is essential since, in the individual articulations, sliding surfaces slide on one another, and, without lubrication, are thus subject to increased levels of wear.

In many applications, in particular in packaging machines of the type described above, however, careful cleaning and cleanliness are of prime importance. In particular in the packaging of foodstuffs, hygienic conditions in the region of the packing machine are imperative. A low level of soiling and also the possibility of easy and thorough cleaning of machine parts, such as a transporting and positioning chain, is thus advantageous in such a packaging machine.

SUMMARY

The object of the invention is thus to propose a chain, and a packaging machine having a chain, which is better than known link chains at meeting requirements in respect of hygiene conditions during operation and cleaning.

Accordingly, a chain according to the invention, and a packaging machine comprising one such chain, is distinguished in that flexible chain links are provided between the rigid chain links and are fixed to the same. Such an articulation-free chain has the advantage that the individual chain links, including the flexible chain links, can be configured with a closed surface, in which case there are no gaps between any structural elements which slide on one another, as would be the case with articulations. The flexible, articulation-free construction reduces the risk of permanent soiling, avoids the need for lubrication and allows easy and quick cleaning of the chain surface.

This configuration of the chain according to the invention means that the chain is particularly suitable for use in regions in which cleanliness is of prime importance. This may be the case, for example, in the production, processing and/or packaging of foodstuffs. However, such a chain may also advantageously be used in chemical installations.

In these cases, it is further advantageous if the chain is rendered corrosion-resistant by an appropriate selection of materials. Furthermore, in particular in terms of hygiene, it is advantageous if the chain can be kept free of germs relatively straightforwardly. This is achieved, for example, by the chain being produced from one or more materials which are resistant to superheated steam. This means that not just easy and quick cleaning, but also good sterilization, are possible, in which case such a chain can even be used where stringent hygiene requirements have to be met.

The chain should also advantageously withstand high mechanical loading. The abovementioned advantages of high mechanical loading capability, corrosion resistance and resistance to superheated steam can be achieved, for example, by using metal, in particular stainless steel, for producing the chain, this in particular also ensuring a high level of dimensional stability during loading. As a result, the chain can be used for precisely positioning machine parts and material which is to be processed. A flexible chain link may be, for example, in the form of a flexible metal strip or metal wire. A braided or twisted chain link in the manner of a wire cable, which may advantageously be provided with a coating for forming a smooth and closed surface, could also be used for forming such flexible chain links.

In an advantageous embodiment of the invention, the chain according to the invention is, or individual links of the articulation-free chain are, provided with guide elements which are suitable for interacting with corresponding machine-mounted guide elements and can thus ensure, on the one hand, precise positioning of the chain and, on the other hand, absorption of any transverse forces which occur.

In a development of this embodiment, the rigid chain links, for this purpose, project in relation to the deformable chain links. Such a projection may also serve as a guide and for absorbing transverse forces, in which case, in addition to the transporting function associated with the tensile loading, the chain can also perform further functions in respect of positioning machine components or material which is to be processed. The projection here may serve as a stop for a drive element, e.g. for a chain pinion.

The connecting locations between such rigid and flexible chain links, for their part, are preferably designed so as to provide a closed surface which is less susceptible to dirt and is easy to clean. The connecting location may be produced with such a surface, for example, by welding or adhesive bonding.

In a further embodiment of the invention, the rigid chain links are fitted on a continuous flexible traction element and are fixed thereon. In this case, those regions of the continuous traction element which are located between the rigid chain links form the flexible chain links. It would thus be conceivable, for example, for rigid chain links to be positioned on a continuous elastic belt and welded thereto. It would also be conceivable, correspondingly, to fit rigid chain links on a cable-like traction element, in particular with a coating or sheath which forms a continuous surface.

In a development of this embodiment, the rigid chain links are provided with an aperture and threaded onto a continuous traction element. Fixing the rigid chain links on such a continuous traction element, e.g. once again, by welding or adhesive bonding, thus likewise results in a chain according to the invention.

Further embodiments, e.g. resulting from the rigid chain links being clamped on a continuous traction element, are likewise conceivable, as is a chain according to the invention being produced from the individual rigid and flexible chain links which are correspondingly connected to one another, e.g. welded or adhesively bonded. In order to connect such chain links, it is further possible to provide undercuts or corresponding formations which improve the mechanical loading capability of the connecting location.

As has already been mentioned above, a chain according to the invention is advantageously used in a packaging machine. It can be used here as a drive chain for individual machine components. However, it is preferably used for transport and/ or positioning of material. The chain according to the invention can thus be used as a replacement for conventional link chains which have been used up until now for transporting and positioning of films, and can thus considerably improve the hygiene conditions in such a packaging machine.

A chain according to the invention is preferably provided with gripper mechanisms in order to grip the material which is to be transported and/or positioned. Such gripper mechanisms are preferably fitted on the rigid chain links, the design of which can be adapted more easily to fastening elements without the functioning of the chain being adversely affected. In particular, the fastening elements do not undergo any deformation during operation, and thus allow the fastening of rigid components, e.g. of gripper mechanisms.

It is preferable in the case of a packaging machine according to the invention for the gripper mechanism to be provided in the form of clamping units which are capable of gripping a packaging film, carrying it along and thus transporting and positioning it via the corresponding chain movement. The gripper mechanisms or the clamping units here may be designed in accordance with the known packaging machines, although, instead of the conventional link chain, the gripper mechanisms are now fastened on the rigid chain links of a chain according to the invention.

Different embodiments of the invention are illustrated in the drawing and explained in more detail with reference to the figures, in which, specifically:

DETAIL DESCRIPTION

Figure 1:
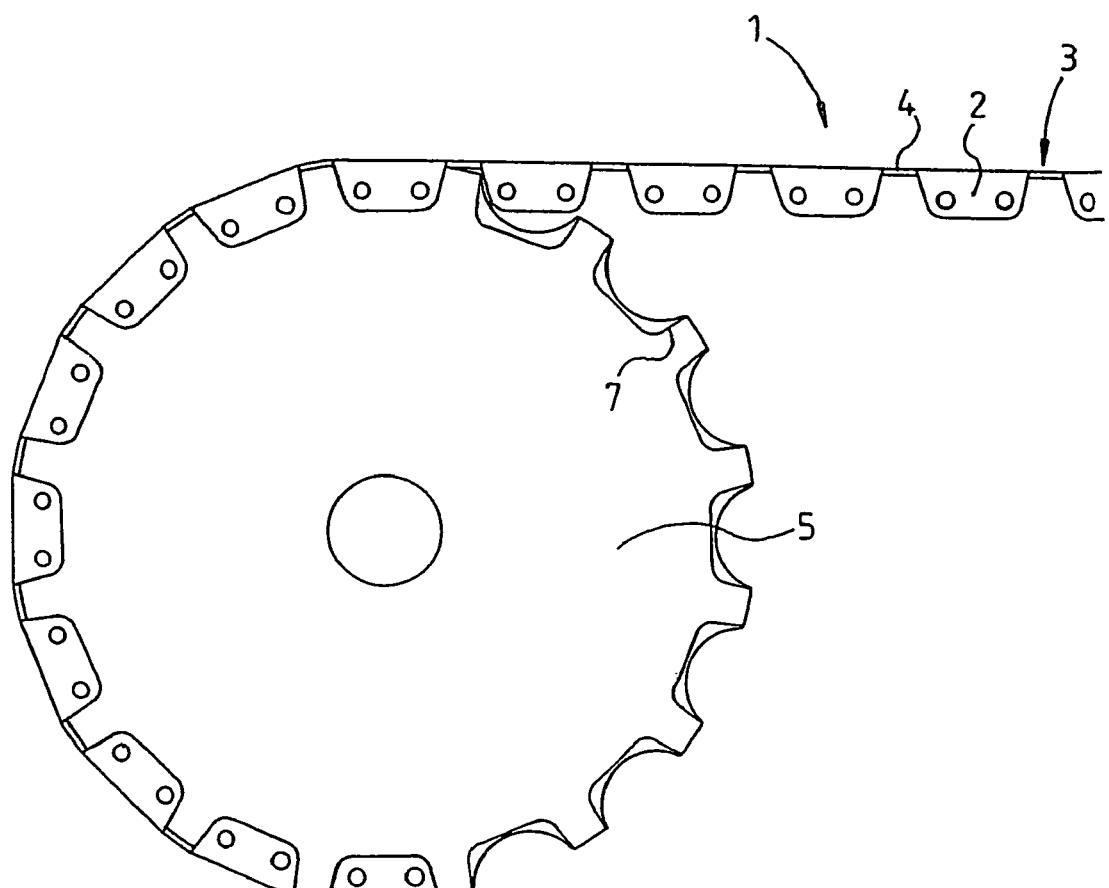
FIG. 1 shows a side view of part of a chain according to the invention which has been positioned on an appropriate drive pinion.
Figure 2:
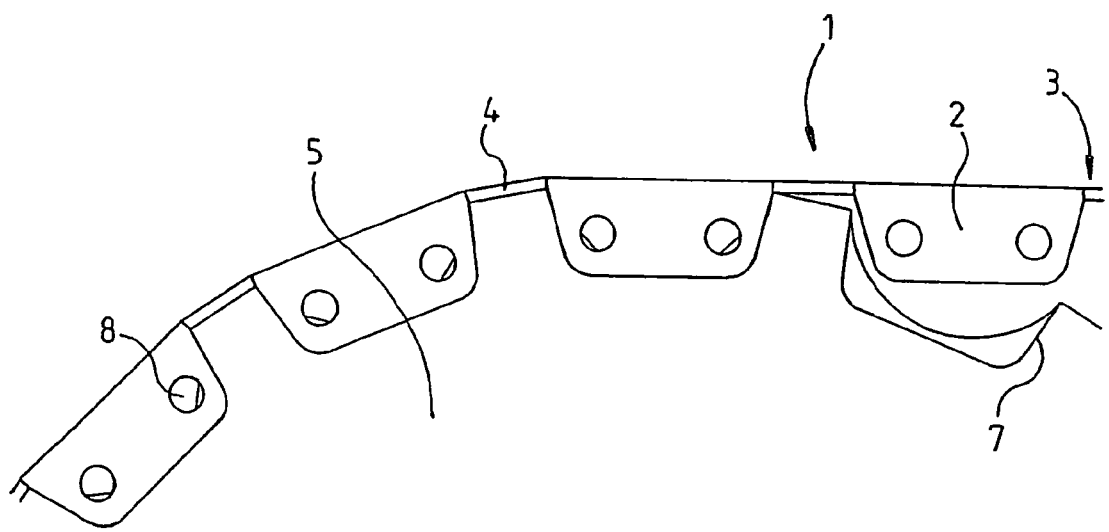
FIG. 2 shows an enlargement of the detail from FIG. 1.

The first exemplary embodiment shows a chain 1 which can be produced in one piece. For this purpose, a continuous flexible metal strip is first of all punched and folded over along certain segments. The rigid chain links 2 are produced by virtue of the flexible strip being stiffened in the region of the folding. The regions in between give flexible chain links 4, by means of which the rigid chain links 2 are connected to one another in a movable manner. The chain 1 is thus capable of running around a drive pinion 5. The teeth 6 here have a contour 7 which can engage in a form-fitting manner between the rigid chain links 2 and thus ensure that the chain 1 is carried along reliably with precise basic positioning.

The chain 1 is thus capable of performing the mechanical functions of a conventional link chain, although the disadvantages of the articulated link chains outlined in the introduction are avoided.

The rigid chain links 2, furthermore, contain bores 8 which serve for fastening further components, e.g. clamping units 9.

Figure 3:
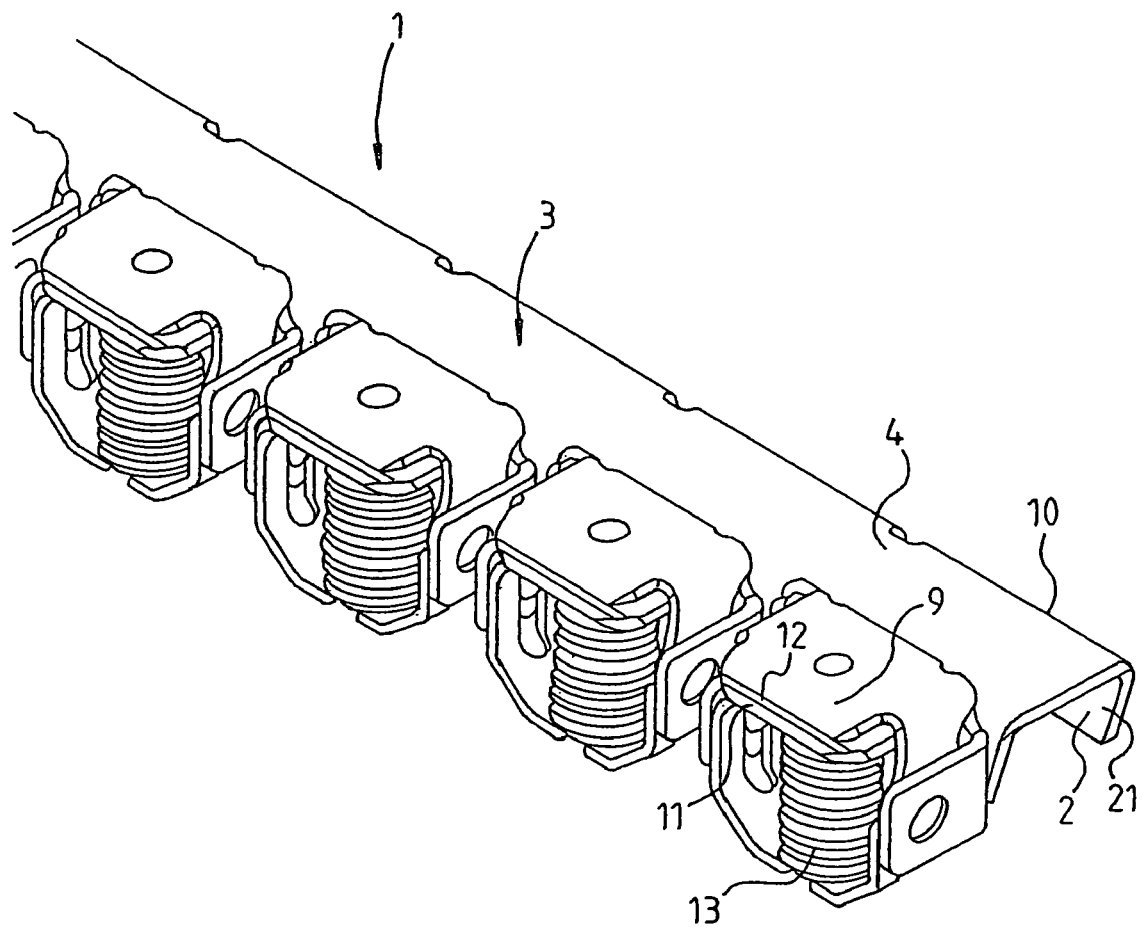
FIG. 3 shows a chain according to FIGS. 1 and 2 with a gripper mechanism.

FIG. 3 shows, alongside the clamping units 9, the U-profile of the rigid chain links 2, this U-profile being formed by folding along the edges 10. This U-profile means that the chain links 2, which are bent from the flexible strip 3, are rigid, whereas the strip-like regions located therebetween form the flexible chain links 4.

The clamping units 9, or other functional units which can be fastened on the chain 1, may be configured differently in accordance with intended usage. Provided in this case are clamping units 9 with clamping lips 11, 12 which can be spread apart from one another and are forced into the closed position by means of a compression spring 13. Using a trigger mechanism (not illustrated specifically), the clamping lips 11, 12 can be spread apart from one another counter to the pressure of the compression spring 13, in which case it is possible for a flat material, e.g. a packaging film to be introduced between the clamping lips 11, 12, clamped in, by virtue of the lips being subjected to pressure via the compression spring 13, and transported, and positioned, by the movement of the chain 1.

Figure 4:
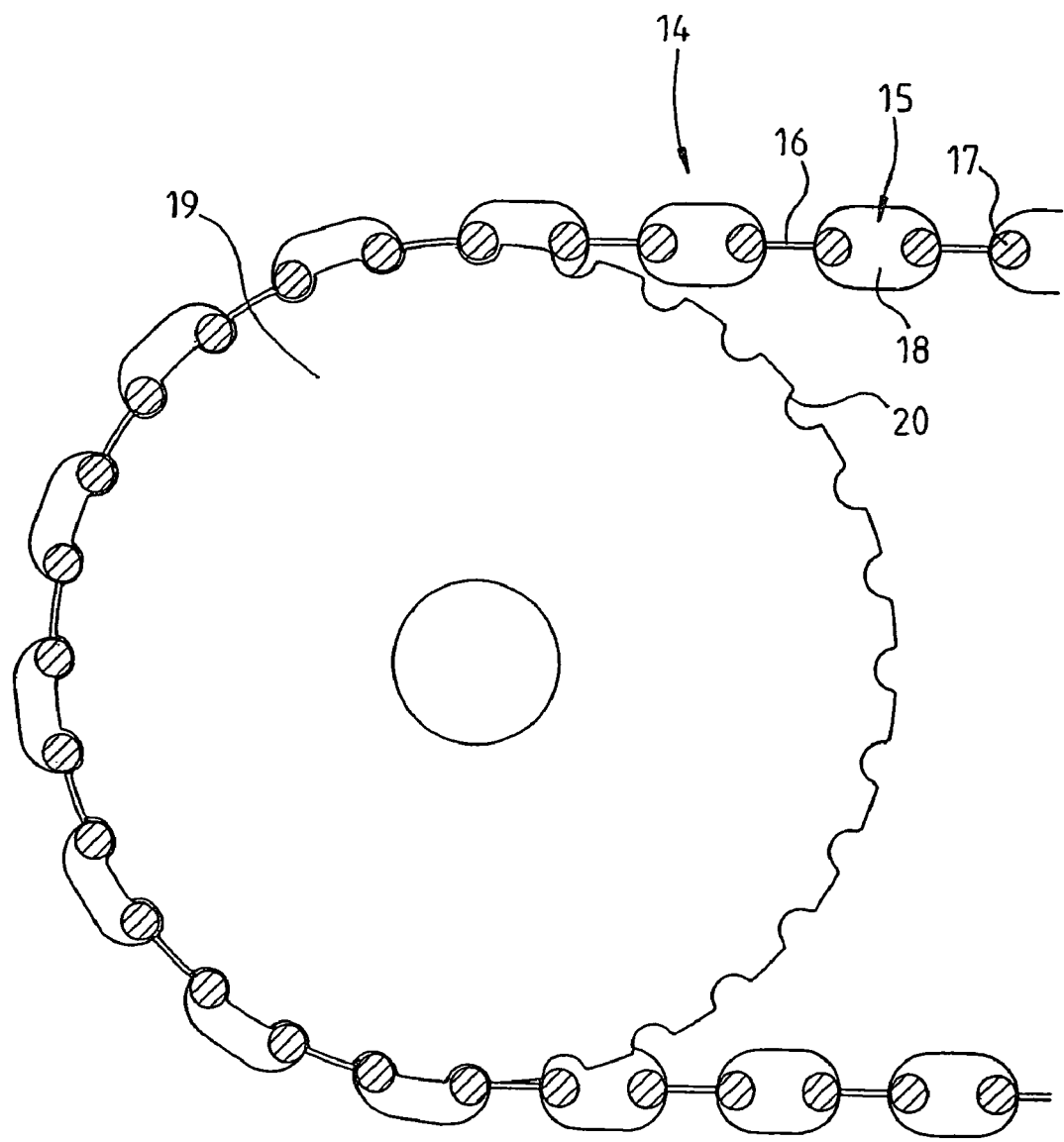
FIG. 4 shows a sectional illustration of a further embodiment of a chain according to the invention, once again with an associated drive pinion.
Figure 5:
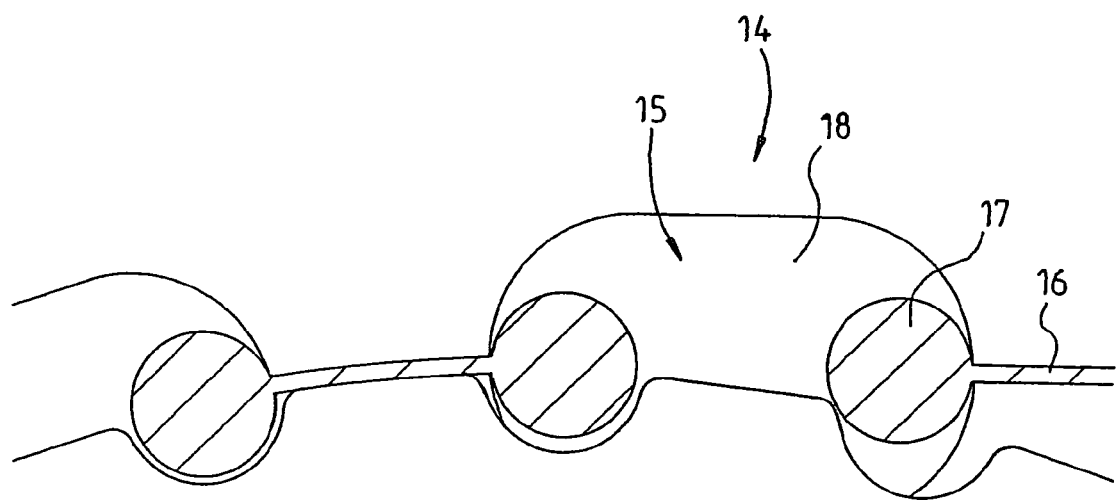
FIG. 5 shows an enlargement of a detail from FIG. 4.
Figure 6:
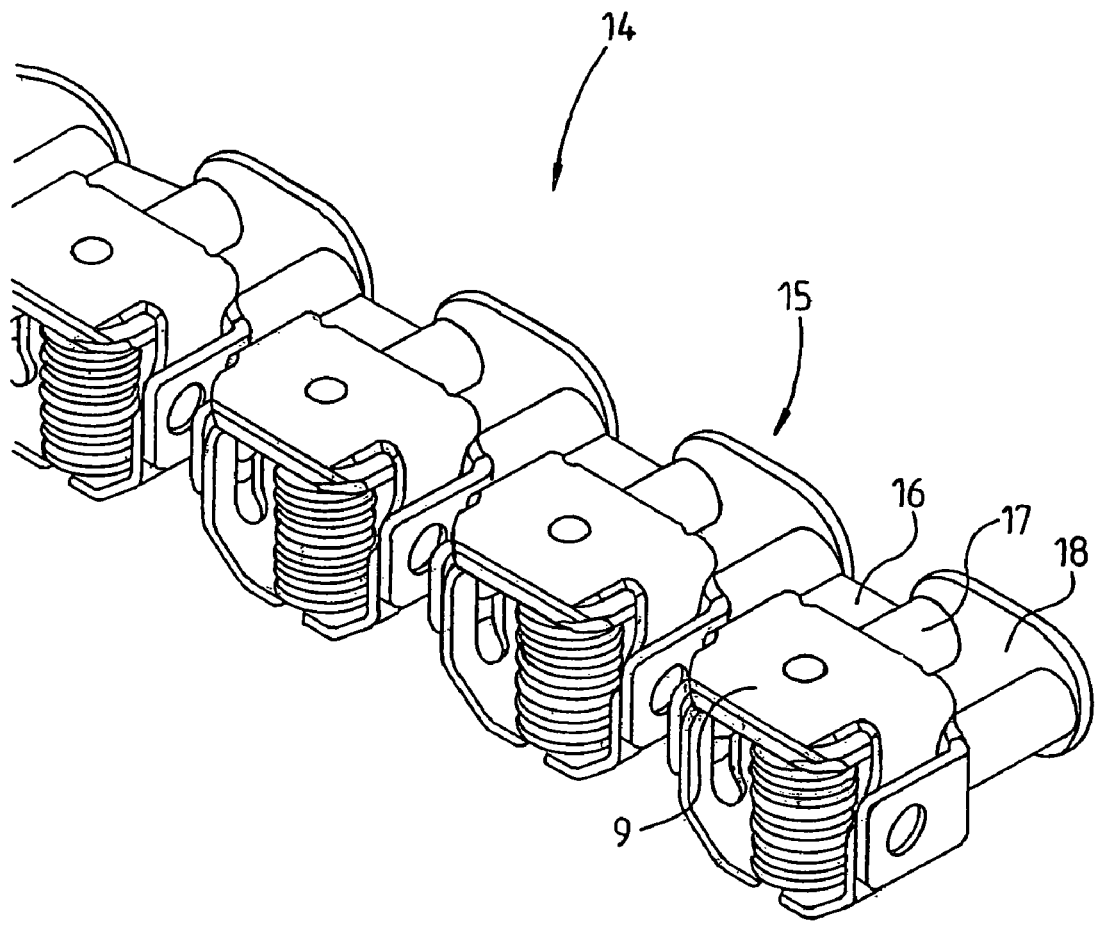
FIG. 6 shows a chain according to the second exemplary embodiment with a gripper mechanism.

The embodiment according to FIGS. 4 to 6 shows a chain 14 in which rigid chain links 15 are connected in an alternating manner to flexible chain links 16. The rigid chain links 15 here are made up of cylindrical transverse pins 17 and side plates 18, in which case the rigid chain links 15 are similar in form to the chain links of conventional articulated chains, although in this case the transverse pins 17 are connected rigidly to the side plates 18. The flexible chain links 16, once again, are of strip-like design and are fixed to the transverse pins 17. The connection between the individual components, i.e. the strip-like, flexible chain links 16 and the transverse pins 17 and also the between the transverse pins 17 and the side plate 18, is preferably made so as to result in a closed surface and no gaps or the like. This is conceivably done, as cited above, for example by welding or adhesive bonding.

In order to improve the stability, it is also possible for the transverse pins 17 to be positioned in corresponding bores or undercuts of the side plates 18 and then connected, e.g. welded or adhesively bonded.

Figure 7:
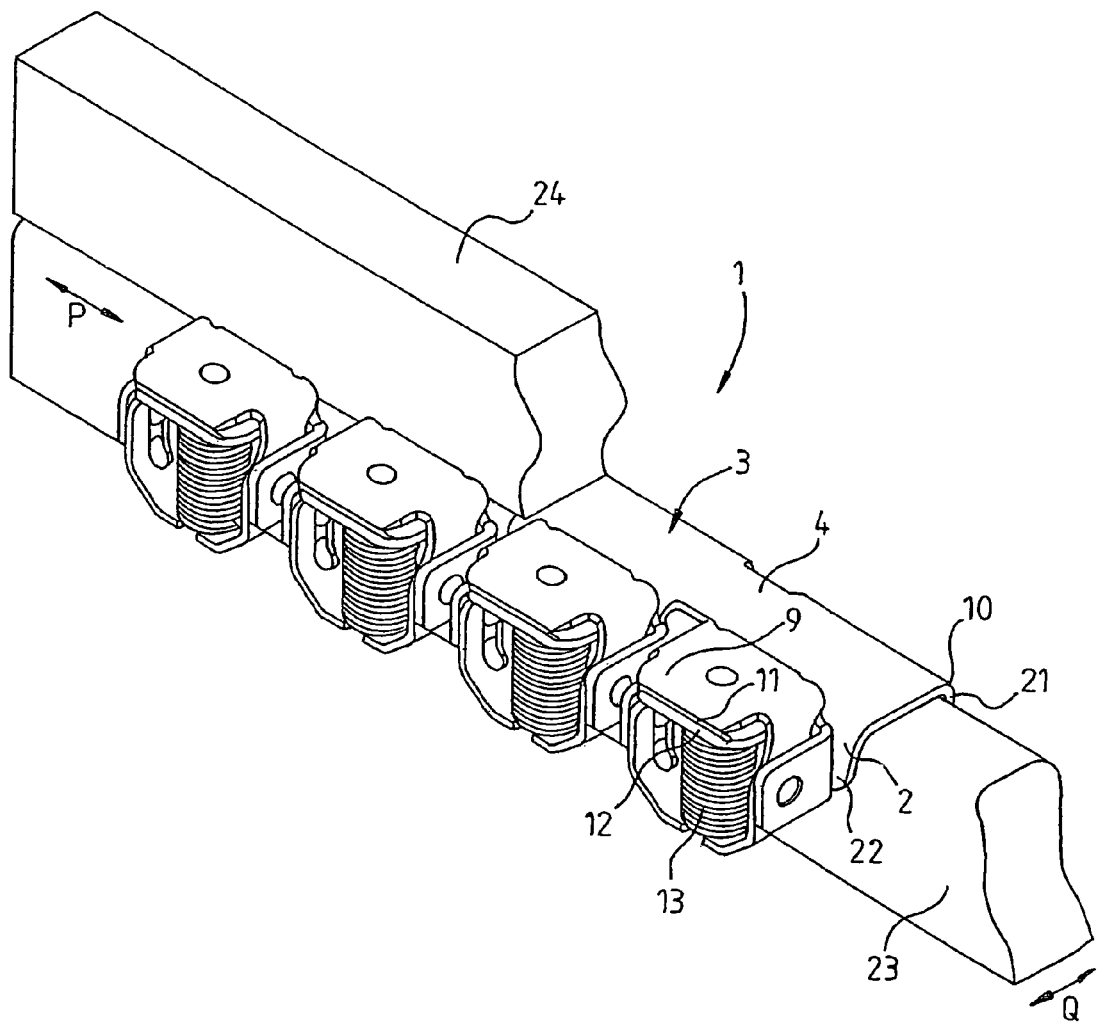
FIG. 7 shows a chain according to FIG. 3 interacting with machine-mounted guide elements.

It is also the case that the embodiment according to FIG. 7 runs around an appropriate drive pinion 19, which is provided with a contour 20 adapted in a form-fitting manner to the transverse pins 17.

FIG. 6 shows a perspective illustration of this chain embodiment. This illustration, in turn, contains clamping units 9 corresponding to the exemplary embodiment described above. It is also the case that any desired functional units can be mounted on a chain 14 according to FIGS. 4 to 6. The mechanical functioning of such a chain 14 thus, in turn, corresponds to a conventional articulated link chain, although the chain 14 has the advantages according to the invention in respect of cleaning and hygiene.

It can be seen in FIG. 7 that the folded portions 21, 22, which form the side legs of a U-profile of the rigid chain links 2, can serve not just for fastening the clamping units 9 but also as guide elements for the precise positioning of the chain 1 and for absorbing transverse forces.

For this purpose, the chain 1 has been positioned on a guide rail 23, in which case the folded portions 21, 22 engage laterally around this guide rail. Furthermore, an abutment 24 has been positioned on the guide rail from above, in which case the chain 1 is fixed in position in all directions, with the exception of the movement directions according to double arrow P. As a result, it is possible for the chain, on the one hand, to position precisely the material groups in the clamping units 9 and, on the other hand, to withstand even transverse forces in the direction of the double arrow Q.

Figure 8:
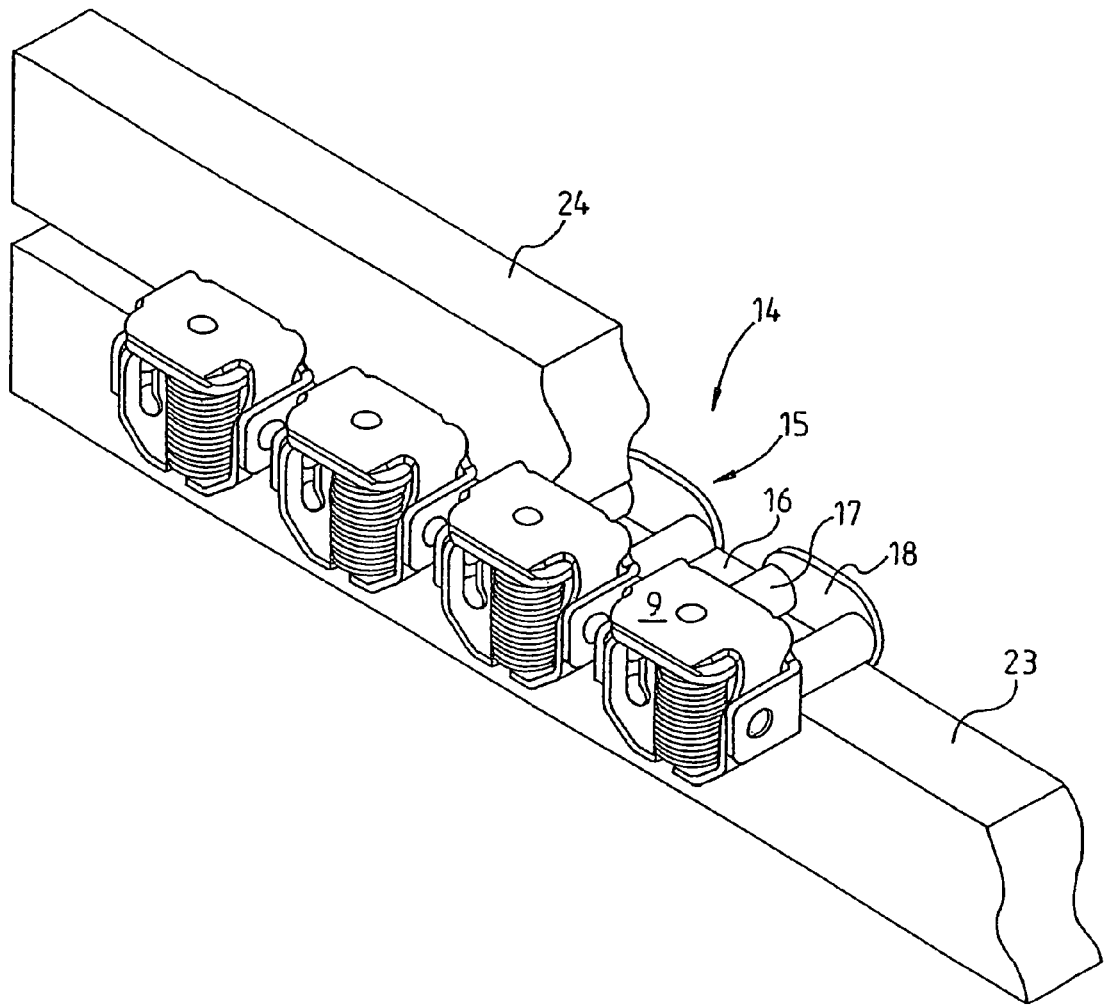
FIG. 8 shows a chain according to FIG. 6 interacting with machine-mounted guide elements.

FIG. 8 shows the chain 14 according to FIG. 6, in turn, interacting with the guide rail 23 with abutment 24. The guide rail 23 here is spaced apart from the abutment 24 to a somewhat greater extent than in the abovementioned embodiment, in order that the transverse pins 17 can be accommodated therebetween. This arrangement also provides for precise positioning and guidance of the chain 14, once again suitable for absorbing high transverse forces by way of the chain 14.

Figure 9:
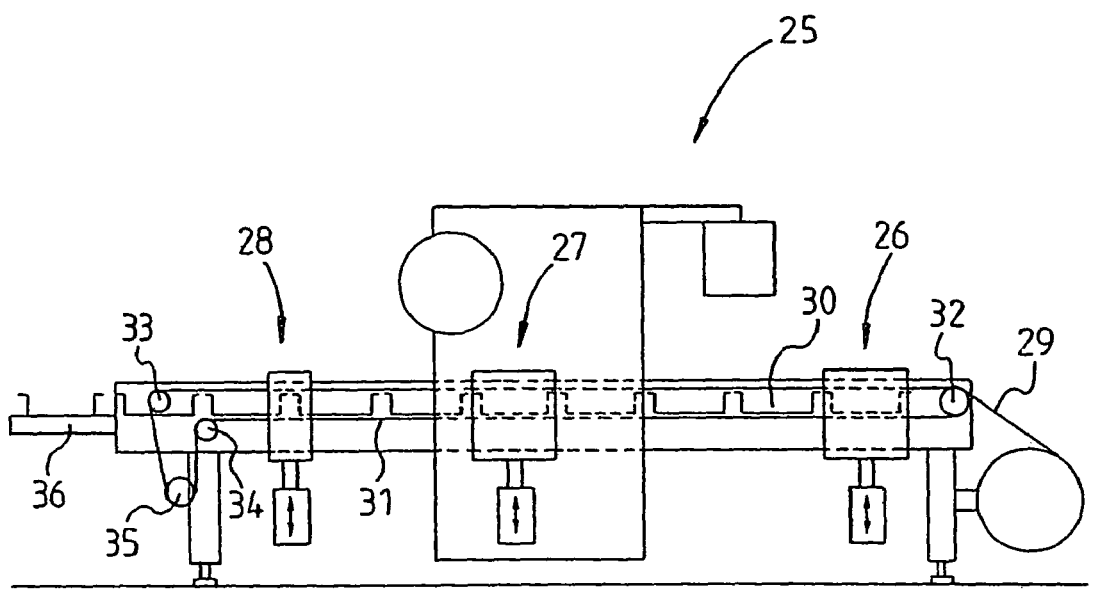
FIG. 9 shows a schematic cross section through a packaging machine having a chain according to the invention.

FIG. 9 shows a packaging machine 25, in this case a so-called thermoforming machine with a forming station 26, a sealing station 27 and a cutting station 28. Cavities 30 are formed, in the forming station 26, from a film 29 which is drawn off from a roll. Once the cavities 30 have been filled, they are sealed in the sealing station and separated from one another in the cutting station 28.

The chain 31 runs around deflecting rollers 32, 33, 34 and around a chain drive 35. In the process it transports the film 29, with the cavities 30 formed therein, up to the discharge belt 36 of the machine.

The invention is not limited to the exemplary embodiment illustrated. Rather, the essential factor is that of the chain being configured by a series of alternating rigid chain links and flexible chain links.

LIST OF DESIGNATIONS

1 Chain
2 Rigid chain link
3 Flexible strip
4 Flexible chain link
5 Drive pinion
6 Teeth
7 Contour
8 Bore
9 Clamping unit
10 Edge
11 Clamping lip
12 Clamping lip
13 Compression spring
14 Chain
15 Rigid chain link
16 Flexible chain link
17 Transverse pin
18 Side plate
19 Drive pinion
20 Contour
21 Folded portion
22 Folded portion
23 Guide rail
24 Abutment
25 Packaging machine
26 Forming station
27 Sealing station
28 Cutting station
29 Film
30 Cavity
31 Chain
32 Deflecting roller
33 Deflecting roller
34 Deflecting roller
35 Chain drive
36 Discharge belt

What is claimed is:

1. A packaging machine having a chain for driving a machine component or for transport of material, wherein the chain has a series of successive rigid chain links, connected to one another in a movable manner, and flexible chain links provided between the rigid chain links, the flexible chain links being fixed to the rigid chain links.

2. The packaging machine of claim 1, wherein the chain is provided with gripper mechanisms.

3. The packaging machine of claim 1, further comprising clamping units, in which a packaging film can be clamped, are provided on the chain.

4. The packaging machine of claim 1, wherein the rigid chain links project in relation to the flexible chain links.

5. The packaging machine of claim 1, wherein the rigid chain links and the flexible chain links, at least in certain regions, are formed of metal and are integrally formed.

6. The packaging machine of claim 1, wherein individual flexible chain links are connected to individual rigid chain links to form the chain.

7. The packaging machine of claim 1, wherein the chain is produced, at least in part, from metal.

8. A chain for use in a packaging machine or a drive pinion, the chain comprising:
a plurality of rigid chain links; and
a plurality of flexible chain links, each of the plurality of flexible chain links being fixed between a respective pair of adjacent rigid chain links, the flexible chain links being less rigid than the rigid chain links; and
the chain comprising a continuous flexible metal strip, such that the rigid chain links and the flexible chain links are formed from the flexible metal strip.

9. The chain of claim 8, wherein the chain is corrosion-resistant and/or resistant to superheated steam.

10. The chain of claim 8, wherein the rigid chain links project in relation to the flexible chain links.

11. The chain of claim 8, wherein the rigid chain links are fitted, and fixed, on a continuous, flexible traction element.

12. The chain of claim 8, wherein the rigid chain links are treaded onto a continuous, flexible traction element.

13. The chain of claim 8, wherein the rigid chain links and the flexible chain links, at least in certain regions, are integrally formed.

14. The chain of claim 8, wherein individual flexible chain links are connected to individual rigid chain links to form the chain.

15. The chain of claim 8, wherein guide elements are provided.

16. The chain of claim 8, wherein the rigid chain links comprise folded regions of flexible metal strip and each of the flexible chain links comprises a non-folded region between adjacent rigid chain links.

17. The chain of claim 16, wherein each folded region has a U-shaped profile.

18. The chain of claim 8, wherein the rigid chain links comprise side plates connected by cylindrical pins, and the flexible chain links comprise a plurality of flexible strips of metal, each flexible strip of metal connected to adjacent cylindrical pins on adjacent rigid chain links.

19. The chain of claim 8, wherein the rigid chain links comprise side plates connected by cylindrical pins, and the flexible chain links comprise a plurality of flexible strips of metal, each flexible strip of metal connected to adjacent cylindrical pins.

20. A chain for use in a packaging machine or a drive pinion, the chain comprising:
- a plurality of rigid chain links; and
- a plurality of flexible chain links, each of the plurality of flexible chain links being fixed between a respective pair of adjacent rigid chain links;

wherein at least some of the rigid chain links have a clamping unit connected thereto, each clamping unit having lips for clamping packaging film.

* * * * *

UNITED STATES PATENT AND TRADEMARK OFFICE
CERTIFICATE OF CORRECTION

| | | |
|---|---|---|
| PATENT NO. | : 7,922,614 B2 | Page 1 of 1 |
| APPLICATION NO. | : 11/990186 | |
| DATED | : April 12, 2011 | |
| INVENTOR(S) | : Ivo Ruzic et al. | |

It is certified that error appears in the above-identified patent and that said Letters Patent is hereby corrected as shown below:

Column 6, Line 42, Claim 12

Delete "treaded" and insert --threaded--

Signed and Sealed this
Ninth Day of August, 2011

David J. Kappos
*Director of the United States Patent and Trademark Office*